(12) United States Patent
Stewart

(10) Patent No.: US 9,537,569 B2
(45) Date of Patent: *Jan. 3, 2017

(54) METHODS AND APPARATUS FOR TARGET IDENTIFICATION

(71) Applicant: AT&T Intellectual Property I, L.P., Atlanta, GA (US)

(72) Inventor: Jerry Stewart, Smithville, MO (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 832 days.

This patent is subject to a terminal disclaimer.

(21) Appl. No.: 13/907,175

(22) Filed: May 31, 2013

(65) Prior Publication Data

US 2015/0256255 A1   Sep. 10, 2015

Related U.S. Application Data

(63) Continuation of application No. 11/780,991, filed on Jul. 20, 2007, now Pat. No. 8,457,498.

(51) Int. Cl.
| | |
|---|---|
| *H04B 10/00* | (2013.01) |
| *H04B 10/112* | (2013.01) |
| *G01S 3/786* | (2006.01) |
| *G01S 17/74* | (2006.01) |
| *G01S 13/78* | (2006.01) |

(52) U.S. Cl.
CPC ........... *H04B 10/1123* (2013.01); *G01S 3/786* (2013.01); *G01S 17/74* (2013.01); *G01S 13/78* (2013.01)

(58) Field of Classification Search
CPC . H04B 10/1123; H04B 10/1143; H04B 10/11; H04B 10/118; G01S 3/786; G01S 17/74; G01S 13/78

USPC ......... 398/112, 118–131, 108, 169–172, 107
See application file for complete search history.

(56) References Cited

U.S. PATENT DOCUMENTS

| | | | | |
|---|---|---|---|---|
| 3,584,220 | A | | 6/1971 | Nomura et al. |
| 3,949,397 | A | * | 4/1976 | Wagner ..................... G01S 7/36 342/16 |
| 4,099,050 | A | | 7/1978 | Sauermann |
| 4,249,265 | A | | 2/1981 | Coester |
| 4,361,911 | A | | 11/1982 | Buser et al. |
| 5,056,736 | A | * | 10/1991 | Barton ...................... F41G 7/26 244/3.13 |
| 5,142,288 | A | | 8/1992 | Cleveland |
| 5,202,783 | A | | 4/1993 | Holland et al. |

(Continued)

OTHER PUBLICATIONS

"Sandia Lab News," vol. 56, No. 5, Mar. 5, 2004 (10 pages).

(Continued)

*Primary Examiner* — Hibret Woldekidan
(74) *Attorney, Agent, or Firm* — Hanley, Flight & Zimmerman, LLC

(57) ABSTRACT

Methods and apparatus for target identification are disclosed. Example methods disclosed herein to respond to a target identification interrogation include aligning an optical transceiver based on a detected optical signal to establish an optical communication link with a target detector, receiving a first signal from the target detector using the optical communication link, extracting a first code from the first signal, and transmitting a second signal using the communication link, wherein the second signal is encoded with a second code based on the first code of the first signal.

20 Claims, 13 Drawing Sheets

(56) References Cited

U.S. PATENT DOCUMENTS

| | | | |
|---|---|---|---|
| 5,231,400 A | 7/1993 | Mouldin et al. | |
| 5,274,379 A * | 12/1993 | Carbonneau | H04B 10/2587 |
| | | | 342/20 |
| 5,299,227 A | 3/1994 | Rose | |
| 5,414,432 A * | 5/1995 | Penny, Jr. | G01S 19/17 |
| | | | 342/357.59 |
| 5,448,052 A | 9/1995 | Taylor et al. | |
| 5,485,301 A * | 1/1996 | Miller | G01S 1/38 |
| | | | 359/305 |
| 5,648,862 A * | 7/1997 | Owen | H04B 10/11 |
| | | | 342/45 |
| 5,686,722 A * | 11/1997 | Dubois | G01S 17/74 |
| | | | 250/203.2 |
| 5,748,138 A * | 5/1998 | Telle | G01S 17/74 |
| | | | 342/13 |
| 5,870,215 A * | 2/1999 | Milano | H04B 10/11 |
| | | | 342/45 |
| 5,966,226 A | 10/1999 | Gerber | |
| 5,966,227 A | 10/1999 | Dubois et al. | |
| 5,974,142 A * | 10/1999 | Heer | H04K 1/00 |
| | | | 379/442 |
| 6,097,330 A * | 8/2000 | Kiser | G01S 17/74 |
| | | | 342/45 |
| 6,101,397 A * | 8/2000 | Grob | H04W 76/04 |
| | | | 379/100.16 |
| 6,664,915 B1 | 12/2003 | Britton | |
| 6,914,518 B1 | 7/2005 | Gerber et al. | |
| 7,046,186 B2 | 5/2006 | Rosenberg et al. | |
| 7,055,420 B1 * | 6/2006 | Lois | F41H 11/02 |
| | | | 342/45 |
| 7,400,712 B2 * | 7/2008 | August | H04M 3/42153 |
| | | | 379/88.01 |
| 7,490,125 B1 | 2/2009 | Jagadeesan et al. | |
| 7,805,080 B2 | 9/2010 | Wang et al. | |
| 8,457,498 B2 * | 6/2013 | Stewart | G01S 3/786 |
| | | | 398/108 |
| 2003/0147651 A1 * | 8/2003 | Roes | F41G 3/2655 |
| | | | 398/108 |
| 2003/0169705 A1 | 9/2003 | Knisely et al. | |
| 2004/0141753 A1 | 7/2004 | Andreu-von Euw et al. | |
| 2004/0208596 A1 | 10/2004 | Bringans et al. | |
| 2005/0078961 A1 | 4/2005 | Wang et al. | |
| 2006/0018661 A1 * | 1/2006 | Green | H04B 10/1127 |
| | | | 398/128 |
| 2006/0049974 A1 * | 3/2006 | Williams | G06K 9/3241 |
| | | | 342/52 |
| 2007/0053695 A1 | 3/2007 | Margaritis | |
| 2009/0074422 A1 | 3/2009 | Stewart | |

OTHER PUBLICATIONS

"What's Next in Science & Technology," Today's Research, Tomorrow's Reality, retrieved from: http://www.whatsnextnetwork.com/technology/index.php/2007/02/21/p4606, Apr. 12, 2007 (4 pages).

USPTO, "Office Action," issued in connection with U.S. Appl. No. 11/780,991, dated Apr. 1, 2010 (29 pages).

USPTO, "Office Action," issued in connection with U.S. Appl. No. 11/780,991, dated Oct. 26, 2010 (28 pages).

USPTO, "Final Office Action," issued in connection with U.S. Appl. No. 11/780,991, dated May 10, 2011 (34 pages).

USPTO, "Office Action," issued in connection with U.S. Appl. No. 11/780,991, dated Nov. 7, 2011 (32 pages).

USPTO, "Final Office Action," issued in connection with U.S. Appl. No. 11/780,991, dated Jul. 6, 2012 (38 pages).

USPTO, "Notice of Allowance," issued in connection with U.S. Appl. No. 11/780,991, dated Feb. 5, 2013 (11 pages).

* cited by examiner

METHODS AND APPARATUS FOR TARGET IDENTIFICATION

RELATED APPLICATION(S)

This patent arises from a continuation of U.S. patent application Ser. No. 11/780,991 (now U.S. Pat. No. 8,457, 498), entitled "METHODS AND APPARATUS FOR TARGET IDENTIFICATION" and filed on Jul. 20, 2007. U.S. patent application Ser. No. 11/780,991 is hereby incorporated by reference in its entirety, and priority to the above-referenced application is hereby claimed.

FIELD OF THE DISCLOSURE

This disclosure relates generally to target acquisition, and, more particularly, to methods and apparatus for target identification.

BACKGROUND

Today's military commander relies on a variety of techniques to acquire and identify potential enemy targets in a battlefield. Such techniques include, for example, radar detection, infrared detection, human reconnaissance, etc. Additionally, in the ever-changing battlefield, a constant situational awareness of friendly assets is needed to allocate such assets properly and avoid the potential for "friendly fire" incidents. Typical "identify friend or foe" (IFF) systems for determining whether a potential target is a friendly or enemy asset utilize physical markings to tag friendly assets and/or radio communications to exchange codes identifying an asset as friendly. However, physical markings for identifying friendly assets are prone to spoofing and are substantially ineffective at night or in battlefield scenarios in which visibility is limited. IFF systems utilizing radio communications are also prone to spoofing and the emitted radio frequency (RF) energy subjects the friendly assets to detection by the enemy.

DETAILED DESCRIPTION

Figure 1:
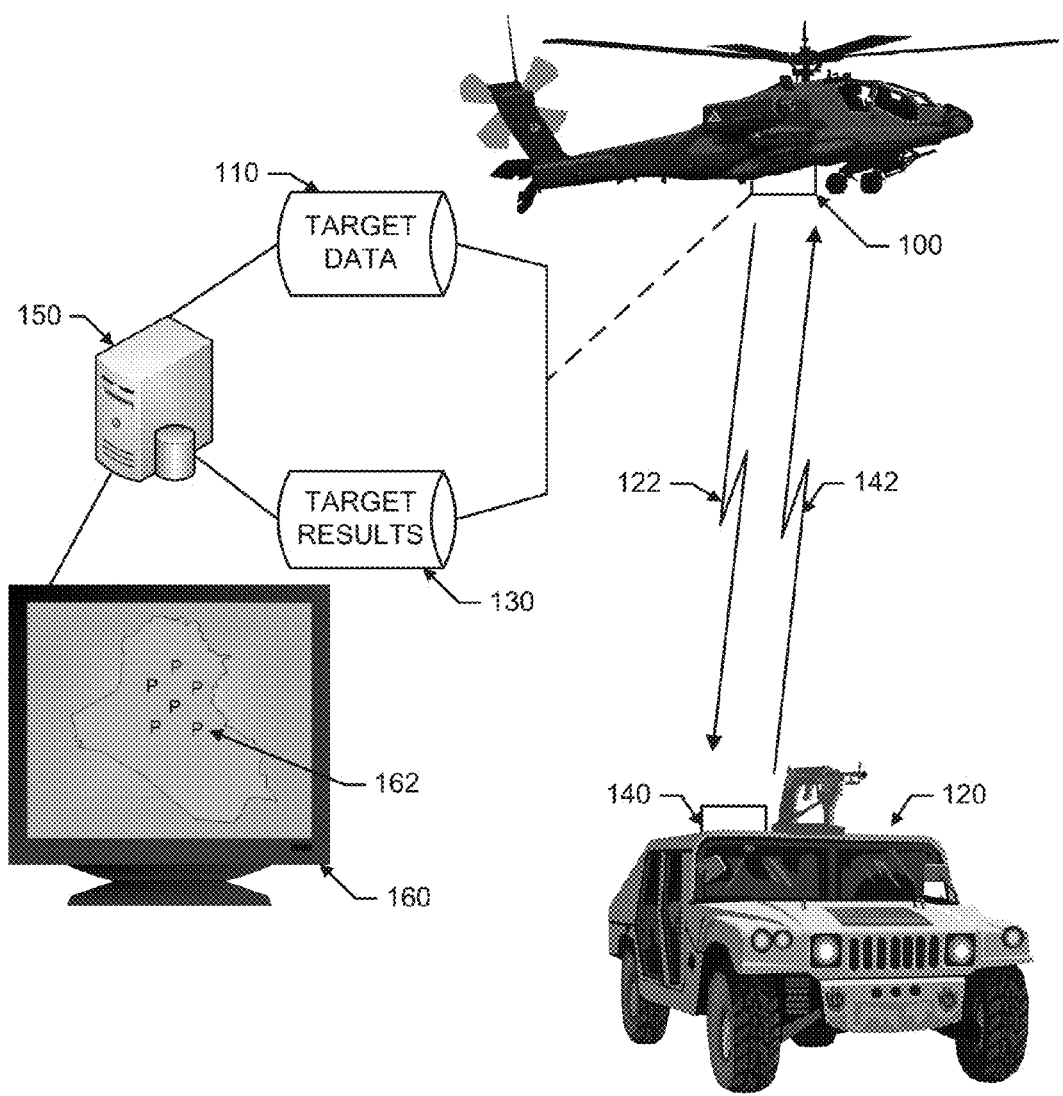
FIG. 1 is a schematic illustration of an example system to identify friendly assets in a battlefield.

FIG. 1 is a schematic illustration of an example system to identify potential targets in a battlefield. In the illustrated example of FIG. 1, the battlefield is scanned to determine potential targets. The location of each potential target is then determined and stored in a database. When a set of potential targets is detected, military personnel and/or military assets are informed of the location of the potential targets. Before deciding whether to engage a particular target in the set of potential targets, an inquiry is made to determine whether the target is a friendly or enemy asset. To determine if a potential target is a friendly or an enemy asset, the target is challenged by a target detector. The target detector determines whether the potential target is a friendly asset and, therefore, should be removed from the potential target database, or whether the potential target is an enemy asset whose status should be retained in the potential target database. Additionally, the target detector can determine and/or refine the location of the potential target and display the potential target's location via any appropriate output device. If a potential target is identified as an enemy asset, the enemy asset may be engaged in any appropriate manner (e.g., weapons may be programmed and launched at the location of the identified enemy asset). If, however, the potential target is identified as a friendly asset, the friendly asset is removed from the target database and any previous engagement of the asset is terminated.

Turning to FIG. 1, to determine the identity of potential targets in a battlefield, the example system includes a target detector 100. In an example implementation, the target detector 100 is mounted on an airplane, helicopter, etc., that may be maneuvered to scan the battlefield. The example target detector 100 accesses a set of potential targets from a data storage such as, for example, the example target data database 110. A potential target may include, but is not limited to, any military ground vehicle 120 (e.g., such as a truck, tank, jeep, etc.), any military installation, (e.g., such as a barracks, road block, warehouse, factory, etc.), an individual soldier, etc. The potential targets may be detected via any type of target detection technique, such as, for example, optical signal detection, radar, infrared (IR) signature detection, radio-frequency (RF) triangulation, etc. Furthermore, the set of potential targets may be determined by devices external to the target detector 100 (e.g., such as an airborne warning and control system (AWACS), a radar installation, etc.) and/or by the target detector 100 itself. The locations of the potential targets are stored in the target data database 110 using any type of location data, such as, for example, global positioning system (GPS) coordinates, longitude and latitude, etc. Furthermore, the location data may be stored in any type of data storage format, such as, for example, a relational database, a computer file, a spreadsheet, etc.

To perform friend-or-foe identification, the example target detector 100 selects a potential target 120 to interrogate from the set of potential targets stored in the example target data database 110. The interrogation involves attempting to establish a secure handshake between the example target detector 100 and the potential target 120 through an exchange of digital codes. In the illustrated example, the example target detector 110 attempts to establish the secure handshake by first outpulsing an optical (e.g., laser) signal to illuminate the potential target 120. As discussed in greater detail below, if the potential target 120 is a friendly asset, the potential target 120 will align its own optical transceiver unit with the outpulsed optical signal. The example target detector 100 then attempts to establish an optical communication link with the potential target 120. In the illustrated example, dense wavelength optical transmission is used for the communication link to reduce the possibility that an enemy will detect communication link emissions capable of disclosing the existence and/or location of the potential target 120 and/or the target detector 100. For example, dense wavelength optical transmission using spectrum wavelengths that are invisible to the human eye and, thus, are indiscernible to an enemy eavesdropper. Alternatively, other transmission technologies may be used to establish the communication link between the target detector 100 and the potential target 120, such as for example, RF communication technology, IR communication technology, etc.

Returning to the illustrated example of FIG. 1, if an optical communication link cannot be established, the secure handshake fails and the example target detector 120 determines that the potential target corresponds to an enemy asset or, alternatively, an unknown asset. If, however, a communication link is established, the example target detector 100 continues the handshake procedure by determining a first code to send to the example potential target 120. The first code is used to establish secure friendly asset identification and, thus, avoid the potential for spoofing by the enemy. The target detector 100 may also request additional response information from the potential target 120 such as, for example, GPS coordinates, movement information since the last communication, voice communication capabilities, etc. For example, after a successful secure handshake, the established optical communication link between the target detector 100 and potential target 120 may be used to implement a secure voice and/or data communication link. As such, the target detector 100 may request information from the potential target 120 concerning its voice and/or data communication capabilities. The example target detector 100 encodes the first code, as well as the request for additional information if present, in a first signal 122. When the first signal 122 has been sent, the example target detector 100 of FIG. 1 may start a timeout timer to wait for a corresponding response.

If a response to the first signal 122 is not received by the target detector 100 within the time set by the timeout timer, the secure handshake fails and the example target detector 120 determines that the potential target corresponds to an enemy asset or, alternatively, an unknown asset and stores this determination status in an example target results database 130 of FIG. 1. The status of the potential target 120 may be stored in any format such as, for example, a spreadsheet, a relational database, a file, a bitmap, etc. If the potential target 120 is identified as an enemy asset, the enemy asset may be engaged in any appropriate manner (e.g., weapons may be programmed and launched at the location of the identified enemy asset). Alternatively, the example target detector 100 may retry the handshake and, thus, the transmission of the first signal 122 to the potential target 120 and/or may update the status of the potential target 120 in the example target results database 130 and/or the example target data database 110 to an unknown status to cause the potential target 120 to be challenged at a later time.

To establish a communication link and receive the first signal 122 sent by the example target detector 100, a friendly potential target 120 includes a target responder 140. In the illustrated example, the target responder 140 includes a dense wavelength optical transmission transceiver able to establish an optical communication link with the example target detector 100. Of course, other example implementations of the target responder 140 can utilize other transceiver technologies as are appropriate for establishing a communication link with a particular implementation of the target detector 100. For example, if appropriate, the target responder 140 may be implemented to support RF communication technology, IR communication technology, etc., consistent with the particular implementation of the target detector 100.

Returning to the illustrated example of FIG. 1, the example target responder 140 also includes a passive optical detector to facilitate alignment of the optical transceiver of the target responder 140 with the optical transceiver of the target detector 100. In an example implementation, the passive optical detector of the target responder 140 is aligned with its optical transceiver. At the start of a secure handshake attempt, the passive optical detector detects the optical signal outpulsed by the target detector 100. The target responder 140 then adjusts the orientation of its passive optical detector and optical transceiver to maximize the amount of optical energy received at the passive optical detector. For example, the target responder 140 may employ a movable platform and/or positionable mirrors that allow the passive optical detector and optical transceiver to be positioned to maximize the optical energy received from the target detector 100. After the target responder 140 determines a desired position for its passive optical detector and optical transceiver, the target transponder 140 may open a diaphragm to enable its optical transmitter to begin emitting an optical signal to the target detector 100. In some example implementations, the target detector 100 may also be configured such that its own optical transceiver is positionable (e.g., via a movable platform and/or positionable mirrors) to further refine the alignment of the optical link between the target detector 100 and target responder 140. In this manner, the target responder 140 and target detector 100 are able to establish a focused, optical communication link that is not readily detectable by an eavesdropper.

After establishing the optical communication link, the example target responder 140 receives the first signal 122 from the example target detector 100. The target responder 140 then demodulates the first signal 122 to determine the first code encoded in the first signal 122 by the target detector 100. The target responder 140 then compares the decoded first code to one or more expected handshake codes to authenticate the first signal 122 from the target detector 100. The expected handshake code(s) may be determined by any method and/or algorithm to determine an authentication code such as, for example, a manually input code, a code resultant from an algorithm (e.g., using time of day and/or day of week as a key to the algorithm, etc.), etc. The target responder 140 compares the first code decoded from the first signal 122 with the expected handshake code(s) to determine if the target detector 100 is a known and/or friendly challenger. If the first code encoded in the first signal 122 does not match an expected code, the secure handshake fails and the target responder 140, therefore, ignores the first signal 122 and does not respond to the target detector 100. Additionally, the target responder 140 may generate a warning or other appropriate signal indicating that the target responder 140 has been targeted by a potentially hostile asset. The warning may cause initiation of appropriate defensive measures to protect the potential target 120 and/or offensive measures to attack the challenger (e.g., the target detector 100).

However, if the decoded first code matches one or more expected handshake code(s) at the target responder 140, the example target responder 140 continues the secure handshake procedure by determining a response to the first signal 122. To prepare an appropriate response, the example target responder 140 determines a second code to encode into a second signal 142. The second code may be determined using any number of method(s) and/or algorithm(s) to create a unique code such as, for example, a manually input value, a code resultant from an algorithm, a code resultant from an algorithm where the key is the first code, etc. In addition to determining the second code, the target responder 140 determines a response to any request(s) for additional information made by the example target detector 100. The additional requested information may include, but is not limited to, the location of the potential target 120 (e.g. specified using GPS coordinates), voice communication capabilities, voice communication frequencies, etc. To send the second code and the response to the requested information, the target responder 140 encodes this information in a second signal 142 and transmits the second signal 142 to the example target detector 100.

Next, the example target detector 100 of FIG. 1 receives and decodes the second signal 142 from the potential target 120. To authenticate the potential target 120 and complete the secure handshake, the example target detector 100 of FIG. 1 determines if the second signal 142 includes an appropriate second handshake code. If the second signal 142 does not include the appropriate second handshake code, the secure handshake fails and the target detector 100 may change the status of the potential target 120 to reflect that no second code was included in the second signal 142 from the potential target 120. This updated status is stored in the example target results database 130. Additionally, the information in the example target data database 110 and/or the example target results database 130 may be updated to reflect that the potential target 120 is an enemy asset or, alternatively, an unknown asset. Once a potential target has been identified as an enemy asset, the enemy asset may be engaged in any appropriate manner (e.g., weapons may be programmed and launched at the location of the identified enemy asset). Alternatively, the example target detector 100 may retry the secure handshake and, thus, retry the transmission of the first signal 122 to the potential target 120 and/or change the status of the potential target 120 in the example target results database 130 to cause the potential target 120 to be challenged at a later time.

However, if the second signal 142 received from the potential target 120 contains an appropriate second code, the example target detector 100 then compares the decoded second code to one or more expected handshake codes to authenticate the second signal 142 sent by the potential target 142. If the decoded second code encoded in the second signal 142 does not match at least one expected code, the secure handshake fails and the target detector 100 may change the status of the potential target 120 to reflect that the second code was an invalid code. Thus updated status is stored in the example target results database 130. Additionally, the information in the example target data database 110 and/or the example target results database 130 may be updated to reflect that the potential target 120 is an enemy asset or, alternatively, an unknown asset. Once a potential target has been identified as an enemy asset, the enemy asset may be engaged in any appropriate manner (e.g., weapons may be programmed and launched at the location of the identified enemy asset). Alternatively, the example target detector 100 may again retry the secure handshake and, thus, retry the transmission of the first signal 122 to the potential target 120 and/or change the status of the potential target 120 in the example target data database 110 to cause the potential target 120 to be challenged at a later time.

If, however, the decoded second code from the second signal 142 matches at least one expected handshake code, the secure handshake is successful and the target detector 100 updates the status of the potential target 120 to reflect that the potential target 120 is a friendly asset. This status information may be stored in the example target data database 110 to prevent the target detector 100 from challenging the potential target 120 in the future. Alternatively, the friendly asset may be removed from the potential target list stored in the example target data database 110. The status of the potential target 120 is also stored in the example target results database 130. If appropriate, once the potential target 120 has been identified as a friendly asset, any previous engagement of the asset is terminated. Furthermore, the status of the potential target 120 may be displayed for personnel to understand the position of friendly assets, enemy assets and unknown potential targets in the battlefield. Upon completion of the successful secure handshake, the communication link established between the target detector 100 and the newly identified friendly asset 120 may be used for voice and/or data communications.

To process the detection results (e.g., asset/target location and status) determined by the target detector 100, the example system of FIG. 1 includes a server 150. The example server 150 retrieves the potential target information and prepares the potential target information for presentation to a user and/or for further processing by appropriate enemy engagement systems. The server 150 retrieves the list of potential target(s) from the example target data database 110 and the status of the potential target(s) stored in the example target results database 130. In the illustrated example, the server 150 processes this information to display the location and status of friendly assets, enemy assets and/or unknown potential target(s) via an example monitor 160. The example monitor 160 may be implemented by any number and/or type(s) of display devices, such as, for example, a computer terminal, a television set, a projection device, etc. In the illustrated example, the example monitor 160 displays a battlefield map 162 and the positioning of the potential targets, wherein a potential target is indicated by a letter "P" (for potential target). After the identification of the potential target 120 by the target detector 100, the example monitor 160 may display the potential target 120 as a letter "F" to denote a friendly asset, a letter "E" to denote an enemy asset, or letter "P" to denote that the identity of the potential target 120 still unknown.

Figure 2:
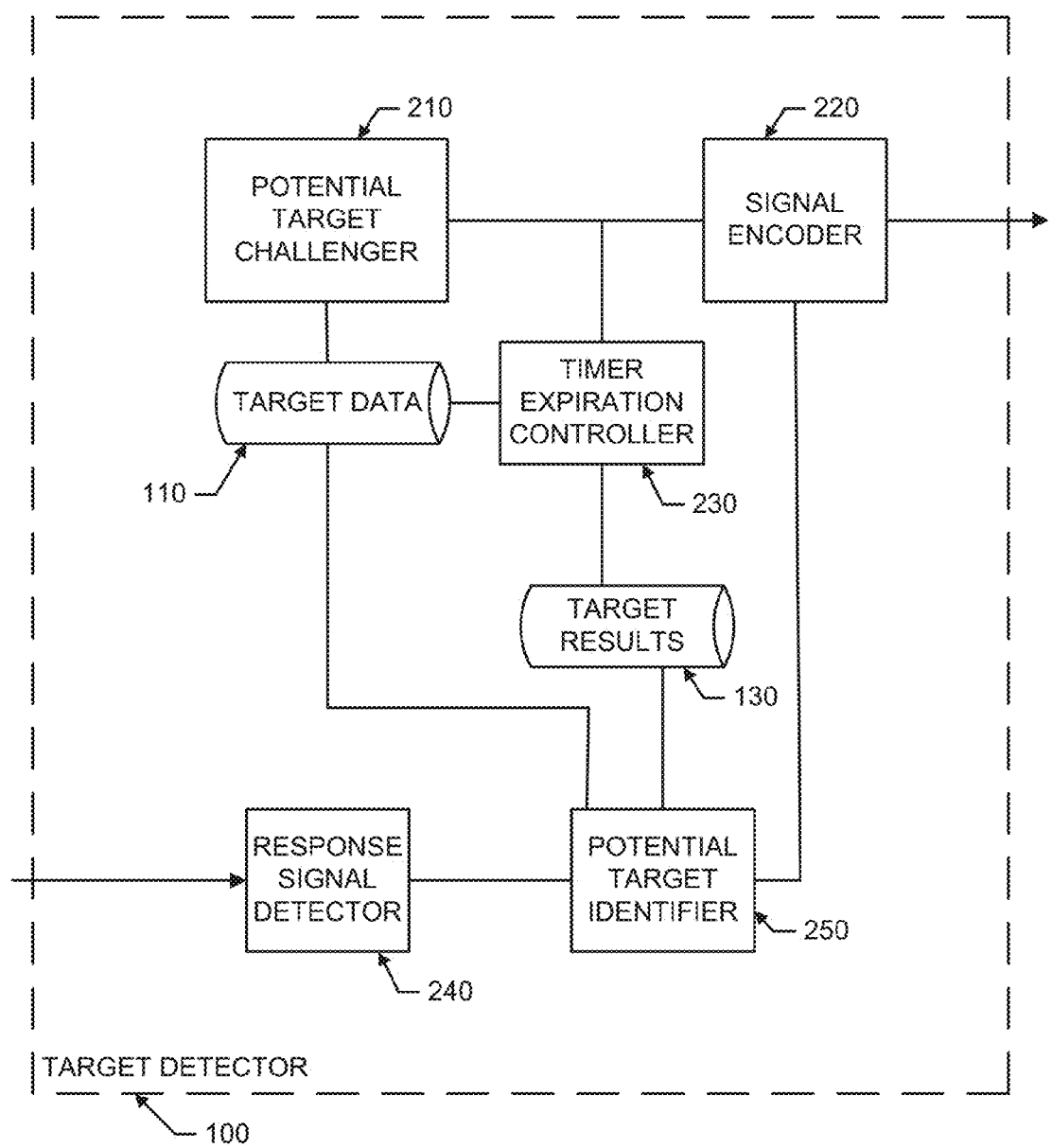
FIG. 2 illustrates an example implementation of the example target detector of FIG. 1.

FIG. 2 illustrates an example implementation of the example target detector 100 of FIG. 1. To select a potential target for identification, the example target detector 100 of FIG. 2 includes a potential target challenger 210. The example potential target challenger 210 retrieves a list of potential targets from, for example, the example target data database 110. The example potential target challenger 210 then selects a potential target, such as the potential target 120 of FIG. 1, to challenge from the target list. The example potential target challenger 210 determines a first handshake code to send to the potential target 120 in, for example, the first signal 122 of FIG. 1. The potential target challenger 210 also sets a timeout timer to wait for a response from the potential target 120 to the first signal 122. The potential target challenger 210 may also determine other information to encode into the first signal 122, such as, for example, a request for additional information as discussed above.

To encode and broadcast the signal 122 to the potential target 120, the example target detector 100 of FIG. 2 includes a signal encoder 220. The example signal encoder 220 receives the information to encode in the first signal 122 from the example potential target challenger 210. This information includes, but is not limited to, the first handshake code for interrogating the potential target 120, the request for additional information, etc. The signal encoder 220 determines the signaling format that is compatible with the potential target 120. In some example implementations, the same signaling format (e.g., such as a dense wavelength optical signaling format) is used for all potential targets 120. In other example implementations, different signal formats are used for different potential targets 120 based on, for example, preliminary detection information obtained when the potential target 120 was initially detected and added to the potential target list. In either case, the signal encoder 220 then encodes the information, including the first handshake code, according to the appropriate signaling format and transmits the signal to the potential target 120 as, for example, the first signal 122 of FIG. 1.

To determine whether the timeout timer has expired after transmission of a particular first signal 122, the example target detector 100 of FIG. 2 includes a timer expiration controller 230. The example timer expiration controller 230 determines timeout events. For example, multiple potential targets 120 may be under identification at any particular time and, thus, multiple timeout timers may be active. When a timer expires, the timer expiration controller 230 determines the potential target 120 corresponding to the expired timer. Once the potential target has been identified, the timer expiration controller 230 releases the timer and determines if a retry to the potential target is to be performed (e.g., based on configuration information). If the timer expiration controller 230 determines that a retry is required, a timer associated with the potential target 120 is set and the example signal encoder 220 is invoked to encode the retry signal for the potential target. If the timer expiration controller 230 determines that no retry is required, the secure handshake is deemed to have failed and the status of the potential target 120 is updated to reflect that the potential target 120 is an enemy asset or, alternatively, an unknown asset depending on the particular application. The updated status information is stored in the example target results database 130.

To receive and decode a response from the potential target 120, the example target detector 100 of FIG. 2 includes a response signal detector 240. The example response signal detector 240 detects a signal, such as the second signal 142, from the potential target 120. The example response signal detector verifies the contents of the received signal 142 and determines if the contents are corrupted. Once the example response signal detector 240 verifies the message contents are not corrupt, the response signal detector 240 decodes the contents.

To determine the identity of the potential target 120, the example target detector 100 of FIG. 2 includes a potential target identifier 250. The example potential target identifier 250 determines the identity of the potential target and updates the status of the potential target in the example target results database 130 and/or the example target data database 110. More specifically, if a second handshake code is not detected in the second signal 142 received by the example response signal detector 240, the potential target identifier 250 determines if a retry to the potential target is to be performed (e.g., based on configuration information). If a retry is required, the potential target identifier 250 invokes the potential target challenger 210 to determine another handshake code to send to the potential target 120 and sets a timeout timer associated with the potential target 120. The signal encoder 220 is then invoked to send the retry signal to the potential target 120. If, however, a retry is not configured, the secure handshake attempt is deemed to have failed and the potential target identifier 250 updates the status of the potential target 120 to indicate it is an enemy asset or, alternatively, an unknown asset depending upon the application. The status and location information for the potential target 120 is then stored in the example target results database 130 and/or the example target data database 110.

If a second handshake code is detected in the second signal 142 received by the response signal detector 240, the potential target identifier 250 compares the detected code against one or more expected handshake codes to authenticate the potential target 120. If the detected second code from the potential target 120 does not match at least one expected handshake code, the potential target identifier 250 determines if a retry to the potential target 120 is to be performed (e.g., based on configuration information). If a retry is required, the potential target identifier 250 invokes the potential target challenger 210 to determine another handshake code to send to the potential target 120 and sets a timeout timer associated with the potential target 120. The signal encoder 220 is then invoked to send the retry signal to the potential target 120. If, however, a retry is not configured, the secure handshake attempt is deemed to have failed and the potential target identifier 250 updates the status of the potential target 120 to indicate it is an enemy asset or, alternatively, an unknown asset depending upon the application. The status and location information for the potential target 120 is then stored in the example target results database 130 and/or the example target data database 110.

However, if the detected second code in the second signal matches at least one expected handshake code, the field identifier 250 records any requested information returned by the potential target 120 (e.g., such as a description of the voice and/or data communication capabilities of the potential target 120). The potential target identifier 250 also updates the status of the potential target 120 stored in the example target data database 110 to indicate the potential target 120 is a friendly asset. Alternatively, the potential target identifier 250 removes the friendly potential target 120 altogether from the target list stored in the example target data database 110. The potential target identifier 250 also updates the status and location information for the newly identified friendly asset 120 in the example target results database 130.

Figure 3:
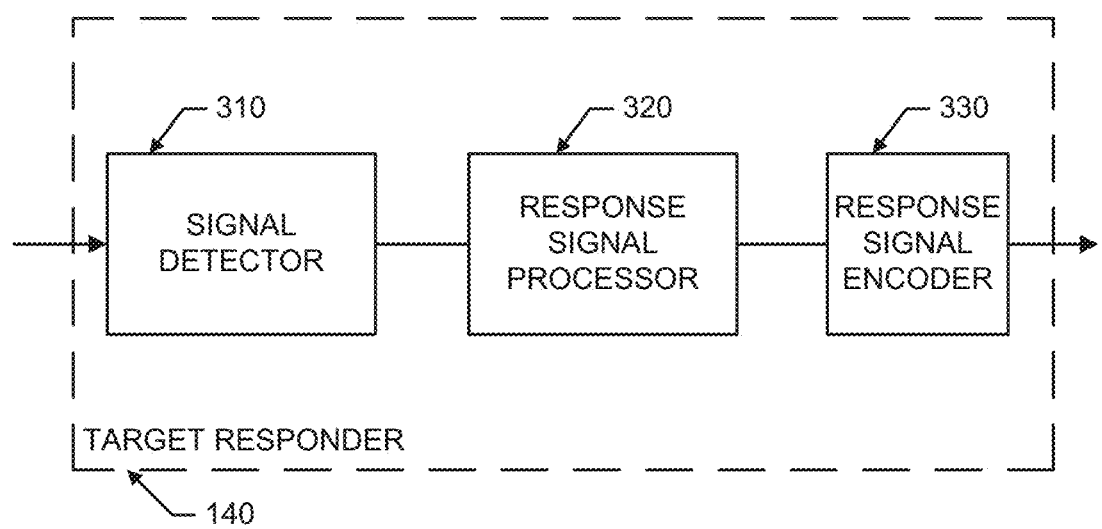
FIG. 3 illustrates an example implementation of the example target responder of FIG. 1.

FIG. 3 illustrates an example implementation of the example target responder 140 of FIG. 1. To detect a secure handshake signal, such as the first signal 122 of FIG. 1, from a target detector, such as the target detector 100 of FIG. 1, the example target responder 140 of FIG. 3 includes a signal detector 310. The example signal detector 310 of FIG. 3 detects the first signal 122 received by the potential target 120. The example signal detector 310 then verifies that the detected signal's contents are correct and not corrupted. The signal detector 310 then attempts to decode the received first signal 122 to determine whether a first handshake code is included in the signal. If a first handshake code is not detected in the first signal 122, the signal detector 310 disregards the first signal 122 and/or generates a warning or other appropriate signal indicating that the target responder 140 has been targeted by a potentially hostile asset. If the first handshake code is detected in the signal, the signal detector 310 compares the decoded first code with one or more expected handshake codes. If the first code does not match at least one expected handshake code, the signal detector 310 disregards the first signal 122 and/or generates a warning or other appropriate signal indicating that the target responder 140 has been targeted by a potentially hostile asset. If the decoded first code matches at least one expected handshake code, the example signal detector 310 of FIG. 3 determines that a response signal, such as the second signal 142, should be sent in response to received first signal.

To determine the information to encode in the response signal 142, the example target responder 140 of FIG. 3 includes a response signal processor 320. The example response signal processor 320 determines a second handshake code in response to the first signal 122. For example, the example response signal processor 320 determines a second handshake code that identifies the potential target 120 as a friendly asset. The response signal processor 320 also determines whether a request for additional information was included in the signal received by the signal detector 310. If a request for additional information is present, the response signal processor 320 obtains the requested information for inclusion in the response signal 142 (e.g., such as a description of the voice and/or data communication capabilities of the potential target 120).

To encode and send the response signal 142, the example target responder 140 of FIG. 3 includes a response signal encoder 330. The example response signal encoder 330 encodes and transmits the signal 142 to the target detector 100 of FIG. 1. More specifically, the response signal encoder 330 receives the second handshake code and additional response information from the example response signal processor 320, formats the second handshake code and other information into an appropriate transmission format, and transmits the signal 142 to the example target detector 100.

Figure 4:
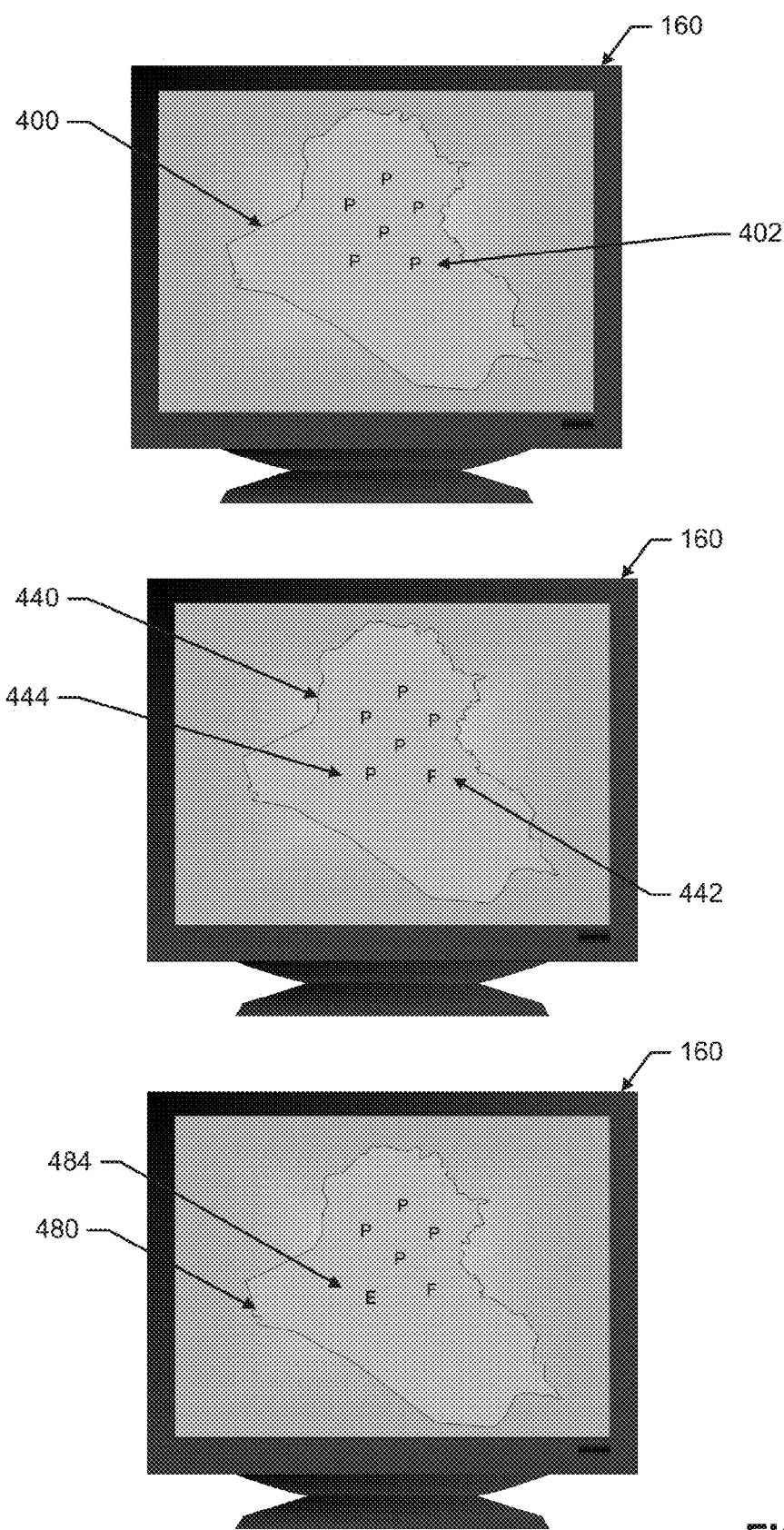
FIG. 4 illustrates example outputs from the example target detector of FIG. 2.

To better illustrate the operation of the example target detector 100 and the example target responder 140 in the example system of FIG. 1, a sequence of three example battlefield map displays are shown in FIG. 4. In the example battlefield map displays of FIG. 4, a letter "P" represents an unidentified potential target, a letter "E" represents a potential target identified to be an enemy asset, and a letter "F" represents a potential target identified to be a friendly asset. In the illustrated example of FIG. 4, a first example battlefield map 400 is displayed at a first instant of time on the example monitor 160. The first battlefield map view 400 contains a pictorial representation of the battlefield, including the location of potential targets in the battlefield. At this first instant in time, each potential target in the first battlefield map view 400 is represented using the letter "P" because no potential targets have yet been identified by the example target detector 100.

The example of FIG. 4 also includes a second example battlefield map view 440 displayed on the example monitor 160 at a later second instant in time. In the illustrated example, between the first instant in time and the second instant in time, the example target detector 100 selected the potential target 402 for identification. To identify the potential target 402, the example potential target challenger 210 of FIG. 2 determines a first handshake code to encode into a first handshake signal. The first handshake signal is transmitted to the potential target 402 via the example signal encoder 220. The example signal detector 310 of FIG. 3 receives the first handshake signal and determines that the decoded first handshake code is valid. The example response signal processor 320 then determines a second handshake code to encode into a second handshake signal, which is then encoded and transmitted via the example response signal encoder 330. The example response signal detector 240 of FIG. 2 receives the second handshake signal and determines that the second handshake signal has not been corrupted. The example potential target identifier 250 then evaluates the second handshake code decoded from the second handshake signal. In the illustrated example, the second handshake code is valid and, thus, the example potential target identifier 250 updates the status of the potential target 402 to a friendly asset. The example server 150 retrieves the updated status of the potential target 402 and changes the potential target 402, represented as a letter "P" in the first battlefield map view 400, to a friendly asset 442, illustrated as a letter "F" in the second battlefield map view 440.

The example of FIG. 4 also includes a third battlefield map 480 displayed on the example monitor 160 at a later third instant in time. In the illustrated example, between the second instant in time and the third instant in time, the example target detector 100 selected the potential target 444 for identification. To identify the potential target 444, the example potential target challenger 210 of FIG. 2 determines a first handshake code to encode into a first handshake signal. The first handshake signal is transmitted to the potential target 444 via the example signal encoder 220. In the illustrated example, the potential target 444 is not a friendly asset and, thus, does not have a compatible communication device. When the timeout timer expires, the example timer expiration controller 230 determines that the potential target 444 has not responded to the first handshake signal. The example timer expiration controller 230 in the illustrate example further determines that no retry is to be attempted. The example timer expiration controller 230 then causes the status of the potential target 444 to be changed to indicate that the potential target 444 is an enemy asset. The example server 150 of FIG. 1 retrieves the updated status of the potential target 444 and changes the potential target 444, represented as a letter "P" in the second battlefield map view 440, to an enemy asset 484, illustrated as a letter "E" in the third battlefield map view 480.

Flowcharts representative of example machine readable instructions for implementing the example target detector 100 of FIGS. 1 and/or 2, and/or the example potential target challenger 210, the example signal encoder 220, the example timer expiration controller 230, the example response signal detector 240 and/or the example potential target identifier 250 of FIG. 2 are shown in FIGS. 5-9. In these examples, the machine readable instructions comprise a program or programs for execution by: (a) a processor such as the processor 1312 shown in the example computer 1300 discussed below in connection with FIG. 13, (b) a controller, and/or (c) any other suitable processing device. The program or programs may be embodied in software stored on a tangible medium such as, for example, a flash memory, a CD-ROM, a floppy disk, a hard drive, a digital versatile disk (DVD), or a memory associated with the processor 1312, but persons of ordinary skill in the art will readily appreciate that the entire program or programs and/or parts thereof could alternatively be executed by a device other than the processor 1312 and/or embodied in firmware or dedicated hardware in a well known manner (e.g., it maybe implemented by an application specific integrated circuit (ASIC), a programmable logic device (PLD), a field programmable logic device (FPLD), discrete logic, etc.). For example, any or all of the example potential target challenger 210, the example signal encoder 220, the example timer expiration controller 230, the example response signal detector 240, the example potential target identifier 250 and/or, more generally, the example target detector 100 could be implemented by software, hardware, and/or firmware. Also, some or all of the machine readable instructions represented by the flowcharts of FIGS. 5-9 may be implemented manually. Further, although the example program or programs are described with reference to the flowcharts illustrated in FIGS. 5-9, persons of ordinary skill in the art will readily appreciate that many other methods of implementing the example machine readable instructions may alternatively be used. For example, the order of execution of the blocks may be changed, and/or some of the blocks described may be changed, eliminated, combined and/or subdivided into multiple blocks.

Figure 5:
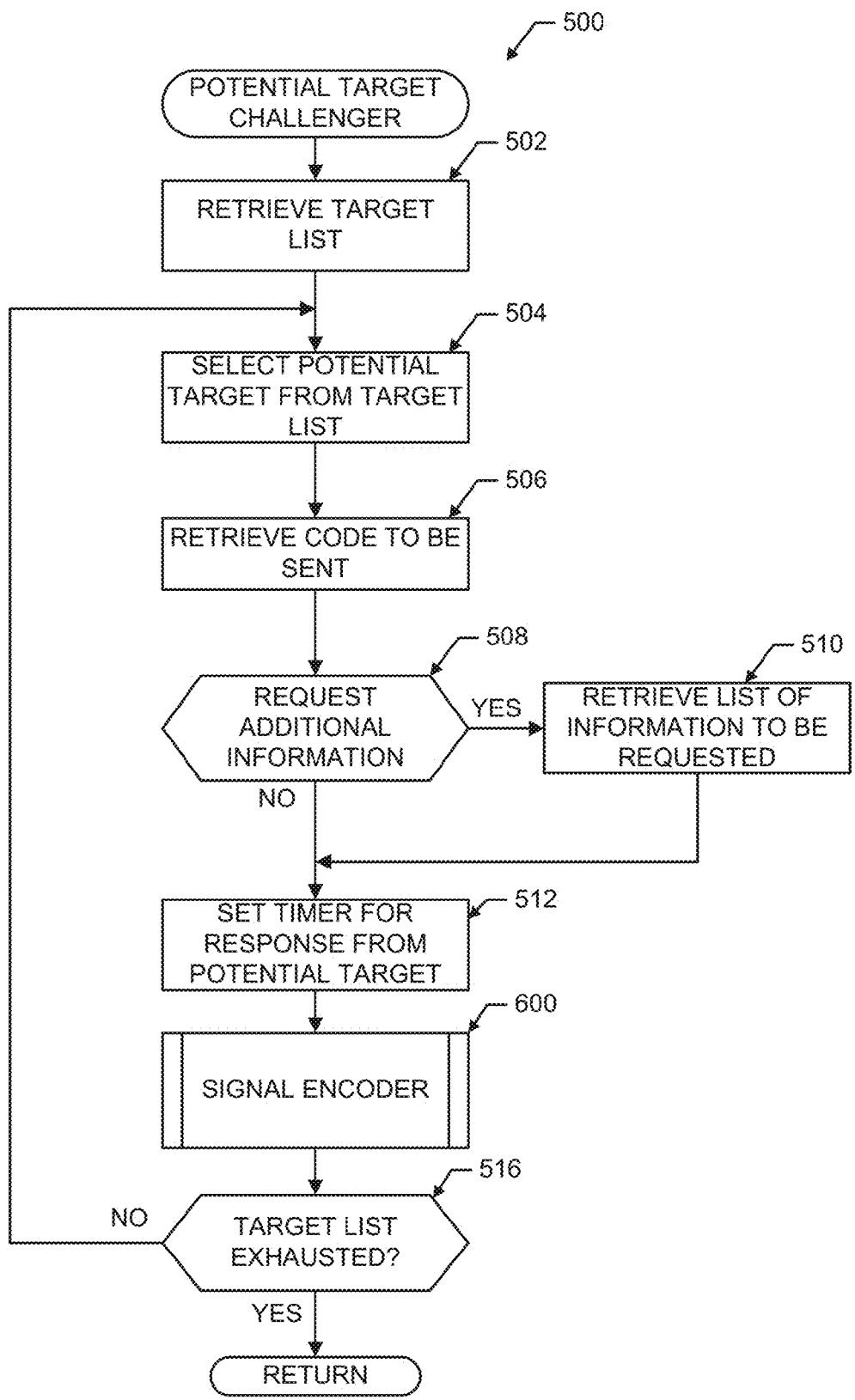
FIG. 5 is a flowchart representative of example machine readable instructions that may be executed to implement the example potential target challenger of FIG. 2.

Example machine readable instructions 500 that may be executed to implement the example potential target challenger 210 of the example target detector 100 of FIG. 2 are illustrated in FIG. 5. The machine readable instructions 500 begin execution at block 502 at which a potential target list is retrieved from the example target data database 110 of FIG. 1. Control then proceeds to block 504 at which a potential target for identification, such as the potential target 120, is selected from the potential target list. Control then proceeds to block 506 at which a first handshake code for interrogating the potential target 120 is retrieved from, for example, the example target data database 110 and/or is determined via execution of any appropriate code generation algorithm. Control then proceeds to block 508 at which a determination is made as to whether additional information is to be requested from the potential target 120 (e.g., such as information describing voice and/or data communication capabilities). If additional information is to be requested from the potential target 120 (block 508), control proceeds to block 510 at which a description of the information to request from the potential target 120 is retrieved.

Next, control proceeds from block 508 or 510 to block 512 at which a timeout timer is set. The timeout timer specified a time to wait for a response from the potential target 120. After the timer is set (block 512), control proceeds to block 600 at which the signal encoder 220 generates a handshake signal to interrogate the potential target 120. For example, the signal encoder 220 may generate the handshake signal at block 600 of FIG. 6 based on the first handshake code and the request for additional information. Example machine readable instructions for implementing the processing at block 600 are shown in FIG. 6 and discussed in greater detail below.

Next, control proceeds to block 516 at which the potential target list is evaluated to determine if the potential target list has been exhausted. If the potential target list has not been exhausted (block 516), control returns to block 504 at which the next potential target to interrogate is selected from the potential target list. However, if the potential target list has been exhausted (block 516), execution of the example machine readable instructions 500 then ends.

Figure 6:
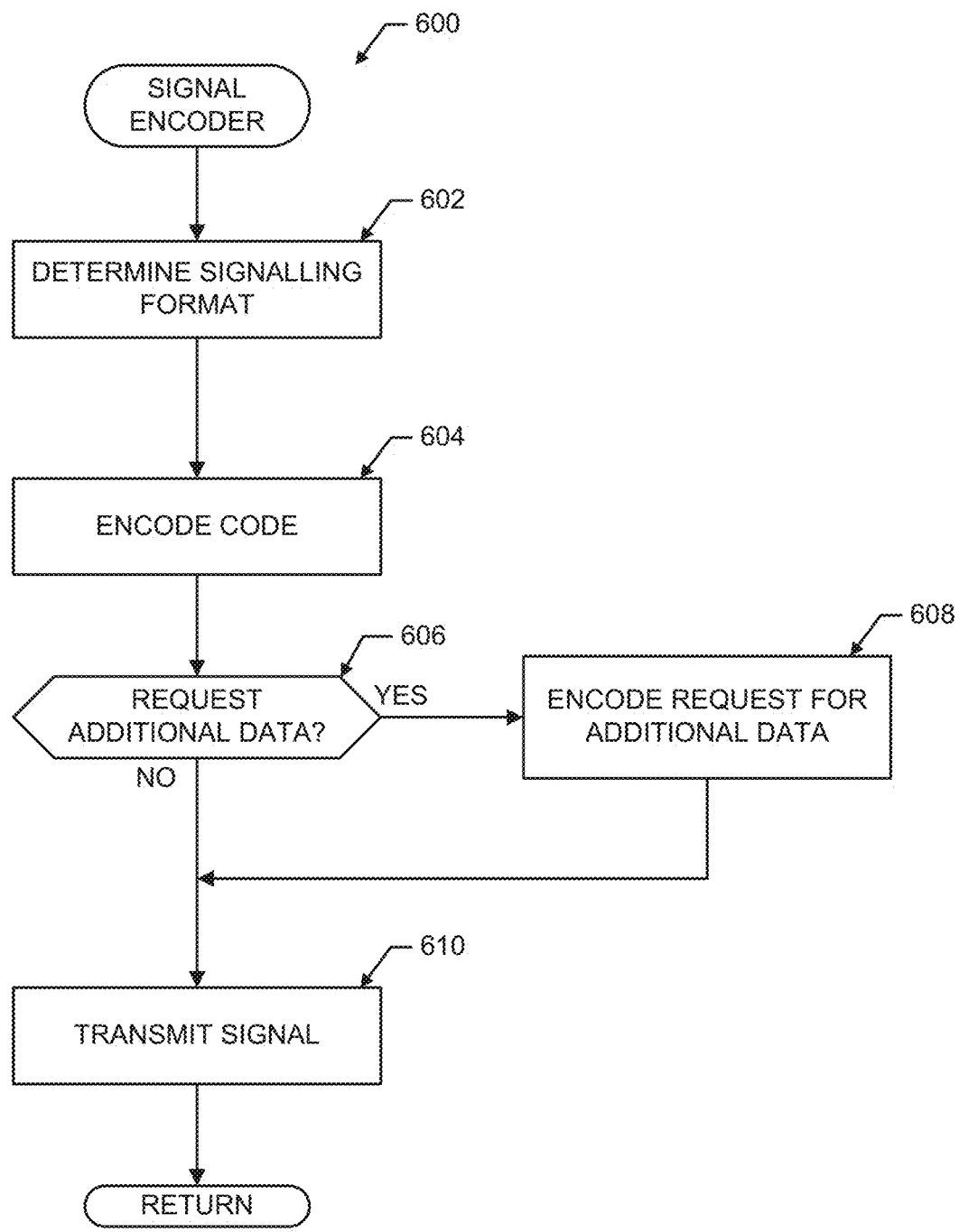
FIG. 6 is a flowchart representative of example machine readable instructions that may be executed to implement the example signal encoder of FIG. 2.

Example machine readable instructions 600 that may be executed to implement the example signal encoder 220 of the example target detector 100 of FIG. 2 and/or the processing at block 600 of FIG. 5 are illustrated in FIG. 6. The machine readable instructions 600 begin execution at block 602 at which the example signal encoder 220 obtains a first handshake code, and a request for additional information, if applicable, for transmission to a potential target, such as the potential target 120. Additionally, at block 602 the signaling encoding protocol necessary to communicate with the potential target 120 is determined. Control then proceeds to block 604 at which the first handshake code is encoded by the example signal encoder 220 for inclusion in a first handshake signal for transmission to the potential target 120. Control then proceeds to block 606 at which the signal encoder 220 determines whether a request for additional information is also to be included in the first handshake signal. If additional information is to be requested from the potential target 120 (block 606), then control proceeds to block 608 at which the additional data request is encoded into the first handshake signal. Control then proceeds from block 606 or 608 to block 610 at which the first handshake signal is then transmitted to the potential target 120 being challenged. Execution of the example machine readable instructions 600 then ends.

Figure 7:
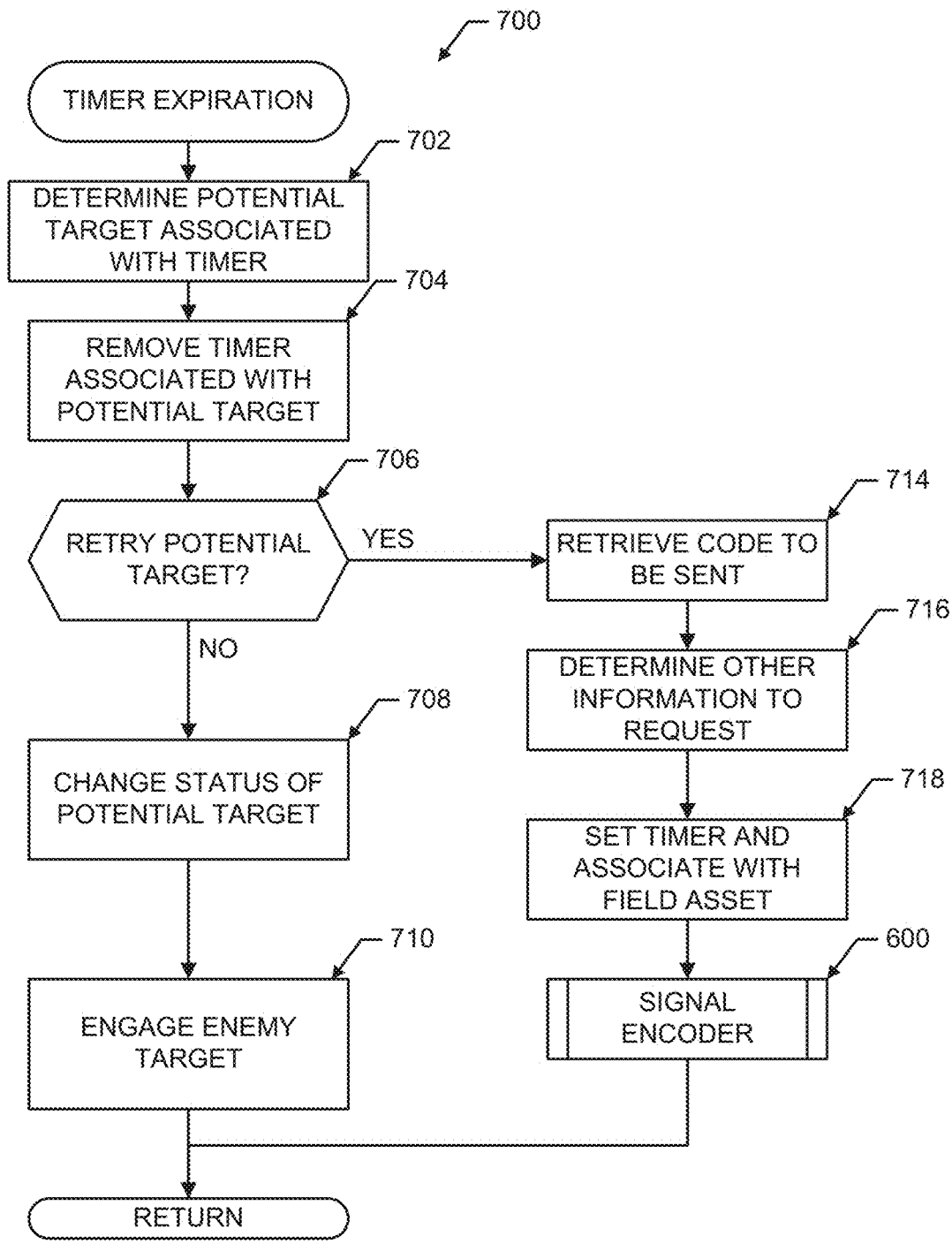
FIG. 7 is a flowchart representative of example machine readable instructions that may be executed to implement the example timer expiration controller of FIG. 2.

Example machine readable instructions 700 that may be executed to implement the example timer expiration controller 230 of the example target detector 100 of FIG. 3 are illustrated in FIG. 7. The machine readable instructions 700 begin execution at block 702 in response to, for example, an interrupt indicating that a timer has expired. The interrupt from the expired timer indicates that a potential target, such as the potential target 120, has not responded to an interrogation (e.g., a handshake signal). At block 702 the potential target 120 being interrogated is determined using the information contained in, for example, the timeout interrupt and a timer table. Next, control proceeds to block 704 at which the example time expiration controller 230 removes the association between the potential target 120 and the expired timer. Control then proceeds to block 706 at which the time expiration controller 230 determines whether the example target detector 100 is configured to retry interrogation attempts made to non-responsive potential targets. If the interrogation of the non-responsive potential target is not to be retried (block 706), control proceeds to block 708 at which the status of the potential target 120 is changed to indicate it is, for example, an enemy target and the updated status information is stored in the example target results database 130 of FIG. 1. After the results have been updated in the example target results database 130 (block 708), control proceeds to block 710 at which an indication is generated to cause the newly identified enemy target 120 to be engaged. Execution of the example machine readable instructions 700 then ends.

Returning to block 706, if the challenge of the potential target 120 is to be retried, control proceeds to block 714 at which a new first handshake code is retrieved from, for example, the example target data database 110 of FIG. 1. Control then proceeds to block 716 at which a request for additional information is encoded in the retry handshake signal being sent to the potential target 120, if appropriate. Control then proceeds to block 718 at which the timer expiration controller 230 sets a timer associated with the potential target 120 being interrogated. After the timer is set at block 718, control proceeds to block 600 at which the signal encoder 220 generates a signal to interrogate the potential target 120. For example, the signal encoder 220 may generate the signal at block 600 of FIG. 7 based on the first handshake code and the request for additional information. Example machine readable instructions for implementing the processing at block 600 are shown in FIG. 6 and discussed in greater detail above. After processing at block 600 completes, execution of the example machine readable instructions 700 then ends.

Figure 8:
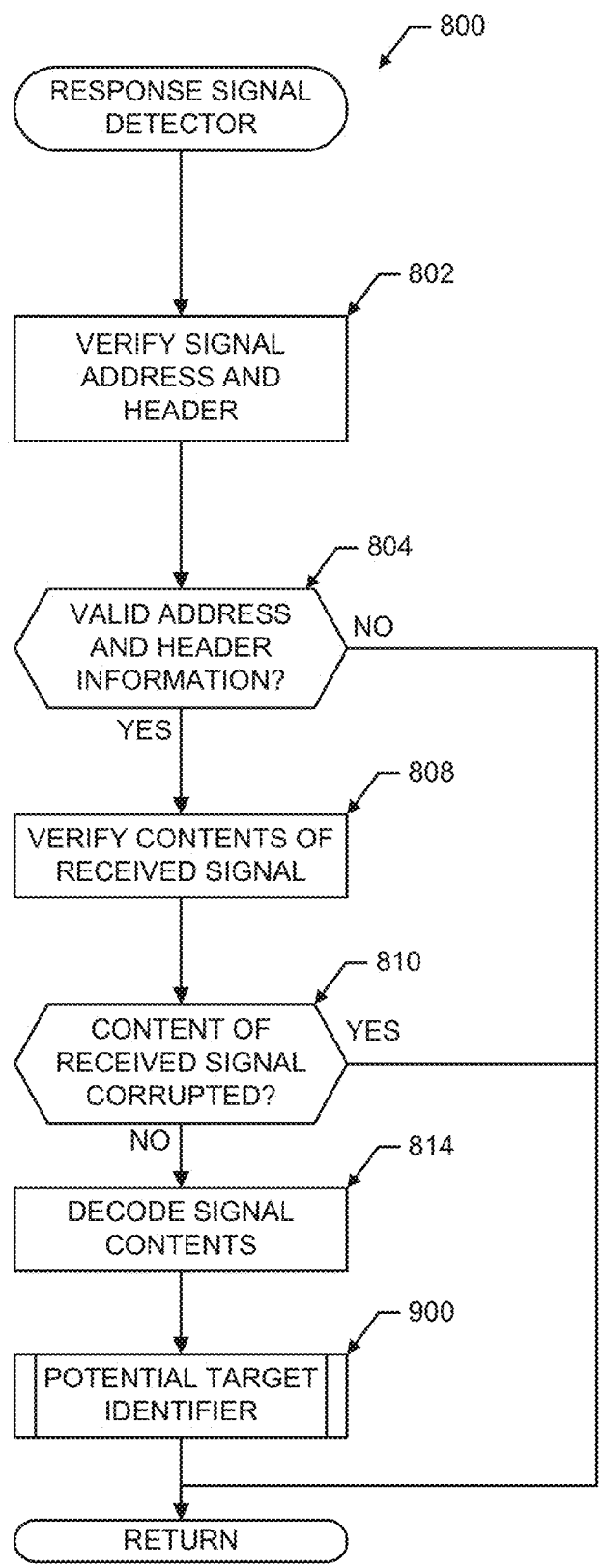
FIG. 8 is a flowchart representative of example machine readable instructions that may be executed to implement the example response signal detector of FIG. 2.

Example machine readable instructions 800 that may be executed to implement the example response signal detector 240 of the example target detector 100 of FIG. 2 are illustrated in FIG. 8. The machine readable instructions 800 begin execution at block 802 at which the example response signal detector 240 detects a response handshake signal from an interrogated potential target, such as the potential target 120. The example response signal detector 240 also verifies a header of the received handshake response signal to determine that it is not corrupted and that the signal is intended for the example target detector 100. Control then proceeds to block 804 at which the example response signal detector 240 determines whether the received response signal header is valid. If the received signal header is invalid and/or the signal is not intended for the example target detector 100 (block 804), execution of the example machine readable instructions 800 then ends. If, however, the signal header is valid and intended for the target detector 100 (block 804), control proceeds to block 808 at which the contents of the signal are evaluated to determine if the signal has been corrupted. Control then proceeds to block 810.

Figure 9:
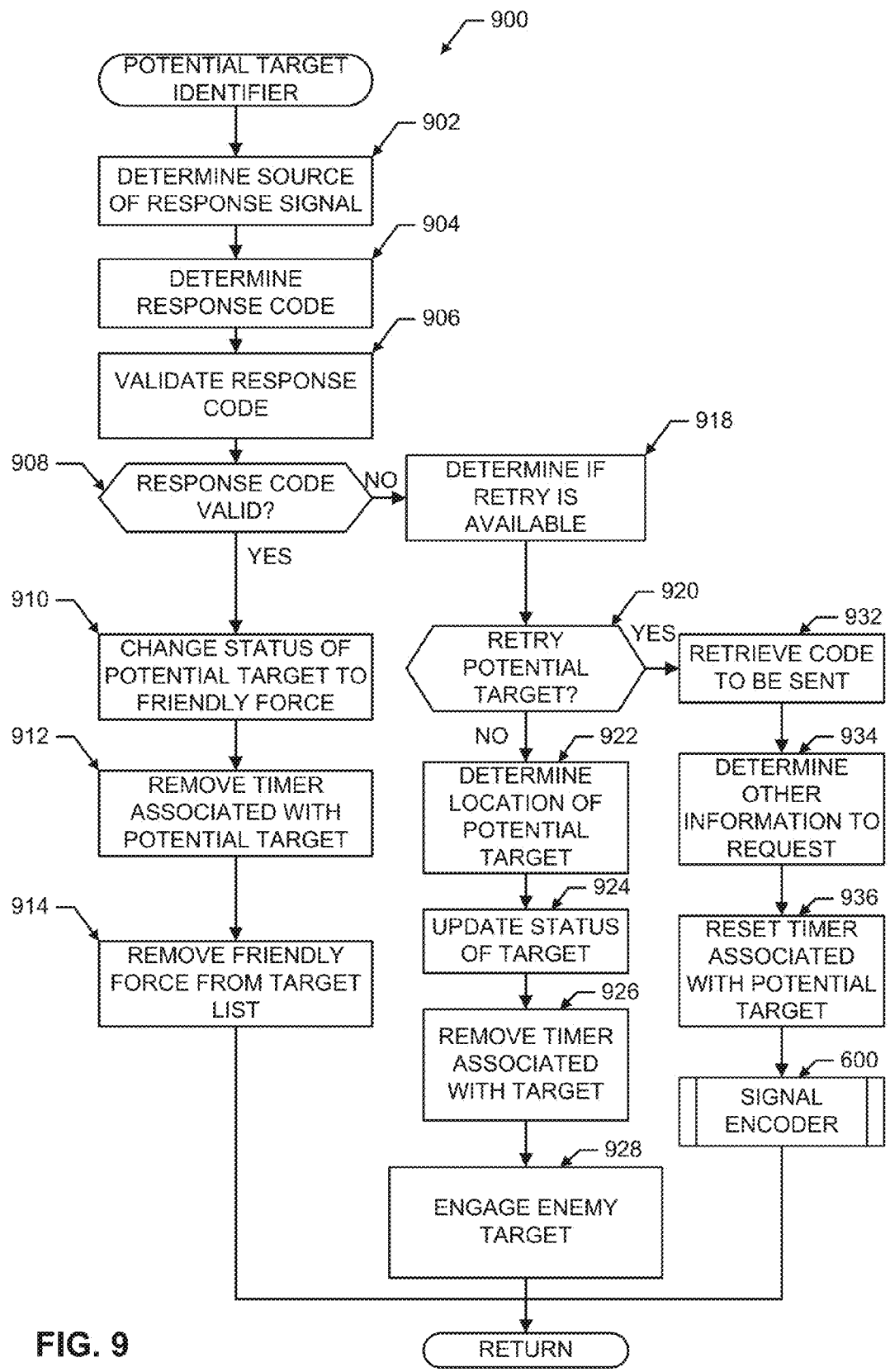
FIG. 9 is a flowchart representative of example machine readable instructions that may be executed to implement the example potential target identifier of FIG. 2.

At block 810, the example response signal detector 240 determines whether the contents of the received handshake response signal are valid. If the contents of the signal are determined to have been corrupted (block 810), execution of the example machine readable instructions 800 then ends. If, however, the contents of the signal have not been corrupted (block 810), control proceeds to block 814 at which the contents of the signal are decoded. Next, control proceeds to block 900 at which the potential target identifier 250 processes the decoded response signal to identify the responding potential target 120. Example machine readable instructions for implementing the processing at block 900 are shown in FIG. 9 and discussed in greater detail below. After processing at block 900 completes, execution of the example machine readable instructions 800 then end.

Example machine readable instructions 900 that may be executed to implement the example potential target identifier 250 of the example target detector 100 of FIG. 2 and/or the processing at block 900 of FIG. 8 are illustrated in FIG. 9. The example machine readable instructions 900 begin execution at block 902 at which the example potential target identifier 250 receives the contents of a decoded handshake response signal and associates the response signal with a particular target being interrogated, such as the potential target 120. Next, control proceeds to block 904 at which one or more expected handshake codes are determined. Control then proceeds to block 906 at which the response handshake code included in the decoded response signal from the potential target 120 is compared to the one or more expected handshake codes determined at block 904. Control then proceeds to block 908 at which this comparison is evaluated. If the response code matches at least one of the expected handshake codes (block 908), control proceeds to block 910. At block 910, the status of the potential target 120 is changed to indicate that the potential target 120 is a friendly asset and the updated status information is stored in, for example, the example target results database 130 of FIG. 1. Control then proceeds to block 912 at which a timer associated with the potential target 120 is cleared. Next, control proceeds to block 914 at which the newly identified friendly asset 120 is removed from the target list stored in, for example, the example target data database 110 of FIG. 1. Execution of the example machine readable instructions 900 then ends.

Returning to block 908, if the response code does not match at least one of the expected codes, control proceeds to block 918. At block 918, a determination is made whether a retry of the handshake attempt to the potential target 120 is to be made (block 918). Control then proceeds to block 920 at which this determination is evaluated. If a retry is not to be attempted for the potential target 120 (block 920), control proceeds to block 922. At block 922, the location of the responding potential target 120 is determined and/or refined, and control proceeds to block 924. At block 924, the status of the potential target 120 is updated indicate the potential target is an enemy target. The updates status is stored in, for example, the example target result database 130 of FIG. 1 and/or the example target data database 110 of FIG. 1. Control then proceeds to block 926 at which a timer associated with the potential target 120 is cleared. Next, control proceeds to block 928 at which an indication is generated to cause the newly identified enemy target 120 to be engaged. Execution of the example machine readable instructions 900 then ends.

Returning to block 920, if a retry is to be attempted for the potential target 120 (block 920), control proceeds to block 932. At block 932, a new handshake code is determined and control proceeds to block 934. At block 934 a request for additional information is encoded in the retry handshake signal being sent to the potential target 120, if appropriate. Control then proceeds to block 936 at which a timeout timer associated with the potential target 120 is reset. Control proceeds to block 600 at which the signal encoder 220 generates a handshake signal to interrogate the potential target 120. For example, the signal encoder 220 may generate the handshake signal at block 600 of FIG. 9 based on the handshake code and the request for additional information. Example machine readable instructions for implementing the processing at block 600 are shown in FIG. 6 and discussed in greater detail above. After processing at block 600 completes, execution of the example machine readable instructions 900 then ends.

Figure 10:
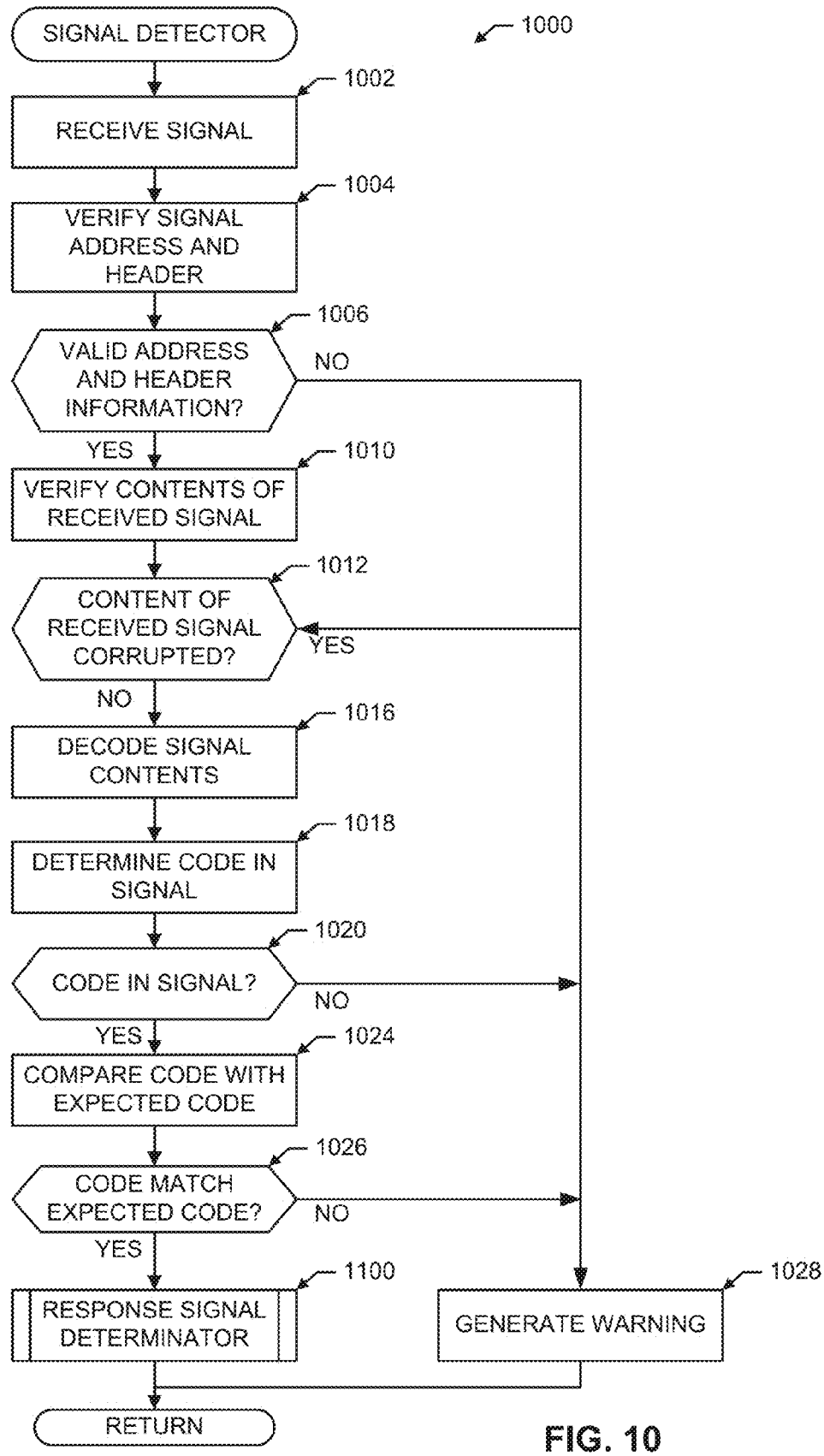
FIG. 10 is a flowchart representative of example machine readable instructions that may be executed to implement the example signal detector of FIG. 3.
Figure 11:
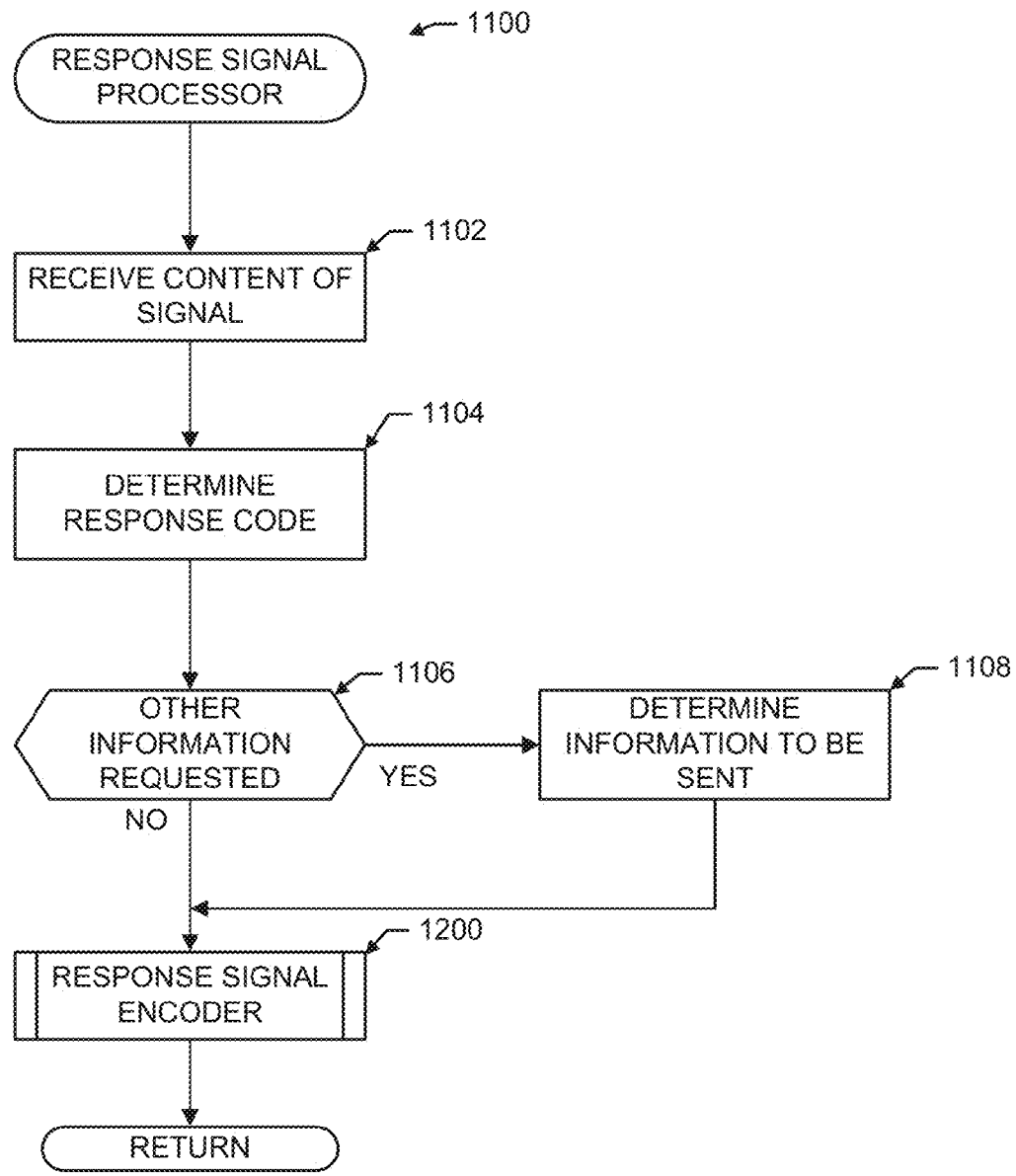
FIG. 11 is a flowchart representative of example machine readable instructions that may be executed to implement the example response signal processor of FIG. 3.
Figure 12:
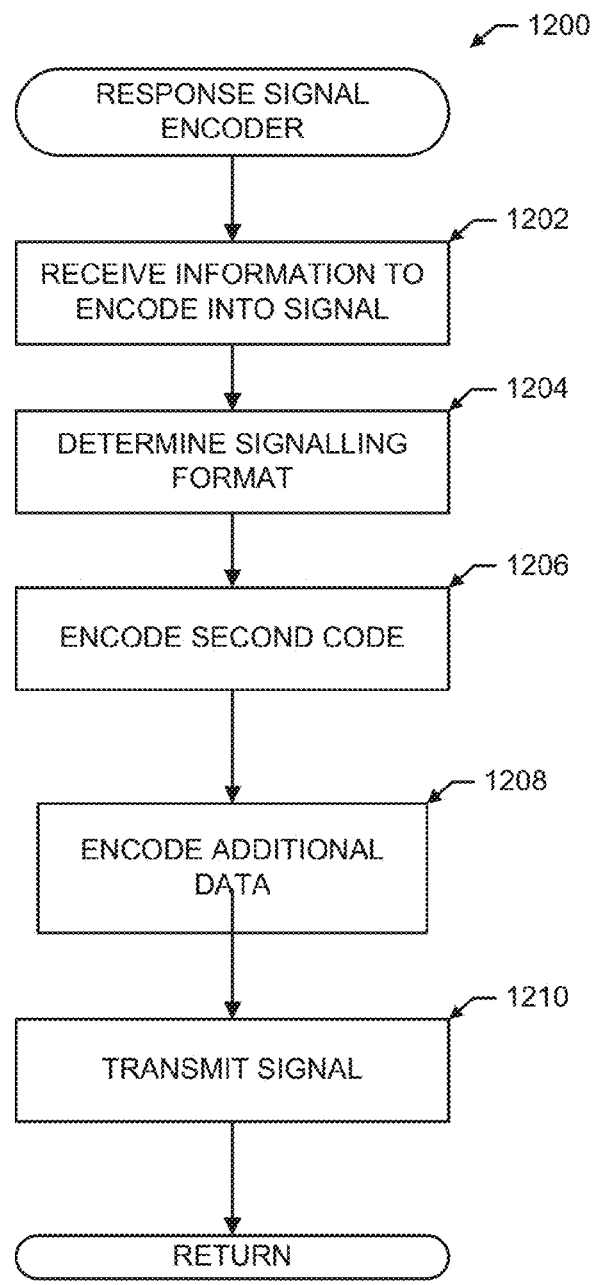
FIG. 12 is a flowchart representative of example machine readable instructions that may be executed to implement the example response signal encoder of FIG. 3.

Flowcharts representative of example machine readable instructions for implementing the target responder 140 of FIGS. 1 and/or 3, and/or the example signal detector 310, the example response signal processor 320 and/or the example response signal encoder 330 of FIG. 3 are shown in FIGS. 10-12. In these examples, the machine readable instructions comprise a program or programs for execution by: (a) a processor such as the processor 1312 shown in the example computer 1300 discussed below in connection with FIG. 13, (b) a controller, and/or (c) any other suitable processing device. The program or programs may be embodied in software stored on a tangible medium such as, for example, a flash memory, a CD-ROM, a floppy disk, a hard drive, a digital versatile disk (DVD), or a memory associated with the processor 1312, but persons of ordinary skill in the art will readily appreciate that the entire program or programs and/or parts thereof could alternatively be executed by a device other than the processor 1312 and/or embodied in firmware or dedicated hardware in a well known manner (e.g., it maybe implemented by an application specific integrated circuit (ASIC), a programmable logic device (PLD), a field programmable logic device (FPLD), discrete logic, etc.). For example, any or all of the example signal detector 310, the example response signal processor 320, the example response signal encoder 330, and/or, more generally, the example target responder 140 could be implemented by software, hardware, and/or firmware. Also, some or all of the machine readable instructions represented by the flowcharts of FIGS. 10-12 may be implemented manually. Further, although the example program or programs are described with reference to the flowchart illustrated in FIGS. 10-12, persons of ordinary skill in the art will readily appreciate that many other methods of implementing the example machine readable instructions may alternatively be used. For example, the order of execution of the blocks may be changed, and/or some of the blocks described may be changed, eliminated, combined and/or subdivided into multiple blocks.

Example machine readable instructions 1000 that may be executed to implement the example signal detector 310 of the example target responder 140 of FIG. 3 are illustrated in FIG. 10. The machine readable instructions 1000 begin execution at block 1002 at which a handshake signal is received from, for example, the target detector 100 of FIG. 1. Control then proceeds to block 1004 at which, for example, a header and a destination address included in the received handshake signal are validated. Control then proceeds to block 1006 at which the example signal detector 310 determines whether the header and address information are valid. If the header and/or destination address are corrupt and/or invalid (block 1006), control proceeds to block 1028 at which the example signal detector 310 causes the example target responder 140 to generate a warning or other appropriate signal indicating that the target responder 140 has been targeted by a potentially hostile asset. As discussed above, the warning may cause initiation of appropriate defensive measures to protect the potential target 120 associated with the target responder 140 and/or offensive measures to attack the challenger (e.g., the target detector 100). Execution of the example machine readable instructions 1000 then ends. If, however, the header and destination address are valid and correct (block 1006), control proceeds to block 1010. At block 1010, the contents of the received handshake signal are verified. Control then proceeds to block 1012 at which the validity of the received signal's contents is evaluated. If the contents of the handshake signal are corrupt (block 1012), control proceeds to block 1028 for generation of the warning or other appropriate signal and execution of the example machine readable instructions 1000 then ends.

However, if the contents of the received handshake signal are valid (block 1012), control proceeds to block 1016. At block 1016, the contents of the handshake signal are decoded. Control then proceeds to block 1018 at which the example signal detector 310 attempts to decode a handshake code decoded from the handshake signal received from the target detector 100. Control then proceeds to block 1020 at which the success of decoding the handshake code is evaluated. If decoding is unsuccessful and, therefore, the handshake code is not contained in the received handshake signal (block 1020),), control proceeds to block 1028 for generation of the warning or other appropriate signal and execution of the example machine readable instructions 1000 then ends. If, however, the handshake code is decoded from the received signal (block 1020), control proceeds to block 1024. At block 1024, the example signal detector 310 determines at least one expected handshake code and compares the expected handshake code with the handshake code decoded from the received signal. Control then proceeds to block 1026 at which this comparison is evaluated. If the decoded handshake code does not match at least one expected handshake code (block 1026), control proceeds to block 1028 for generation of the warning or other appropriate signal and execution of the example machine readable instructions 1000 then ends.

However, if the decoded handshake code matches at least one expected handshake code (block 1026), control proceeds to block 1100. At block 1100, the response signal processor 320 is called to process the contents of the received handshake signal. Example machine readable instructions for implementing the processing at block 1100 are shown in FIG. 11 and discussed in greater detail below. After processing at block 1100 completes, execution of the example machine readable instructions 1000 then ends.

Example machine readable instructions 1100 that may be executed to implement the example response signal processor 320 of the example target responder 140 of FIG. 3 and/or the processing at block 1100 of FIG. 10 are illustrated in FIG. 11. The machine readable instructions 1100 begin execution at block 1102 at which the example response signal processor 320 obtains the contents of a detected handshake signal received from, for example, the target detector 100 of FIG. 1. Control then proceeds to block 1104 at which a response handshake code is determined for sending to the example target detector 100 in response to the received handshake signal. Control then proceeds to block 1106 at which the response signal processor 320 determines whether the received signal included a request for additional information. If additional information was requested (block 1106), the requested information is determined at block 1108. Then, control proceeds from blocks 1106 or 1108 to block 1200 at which the example response signal encoder 330 is called to generate a response handshake signal to send to the target detector 100. Example machine readable instructions for implementing the processing at block 1200 are shown in FIG. 12 and discussed in greater detail below. After processing at block 1200 completes, execution of the example machine readable instructions 1100 then ends.

Example machine readable instructions 1200 that may be executed to implement the example response signal encoder 330 of the example target responder 140 of FIG. 3 and/or the processing at block 1200 of FIG. 11 are illustrated in FIG. 12. The machine readable instructions 1220 begin execution at block 1202 at which the example response signal encoder 330 obtains the contents for inclusion in the response handshake signal to be transmitted to, for example, the example target detector 100 of FIG. 1. Control proceeds to block 1204 at which the format for encoding the response signal for transmission to the target detector 100 is determined. Control then proceeds to block 1206 at which a response handshake code is encoded into the response signal. Control then proceeds to block 1208 at which any other requested information is encoded into the response signal (e.g., if any additional information had been requested in a signal received from the target detector 100). Control then proceeds to block 1210 at which the encoded response handshake signal is transmitted to the particular target detector 100 corresponding to the previously received handshake signal. Execution of the example machine readable instructions 1200 then ends.

Figure 13:
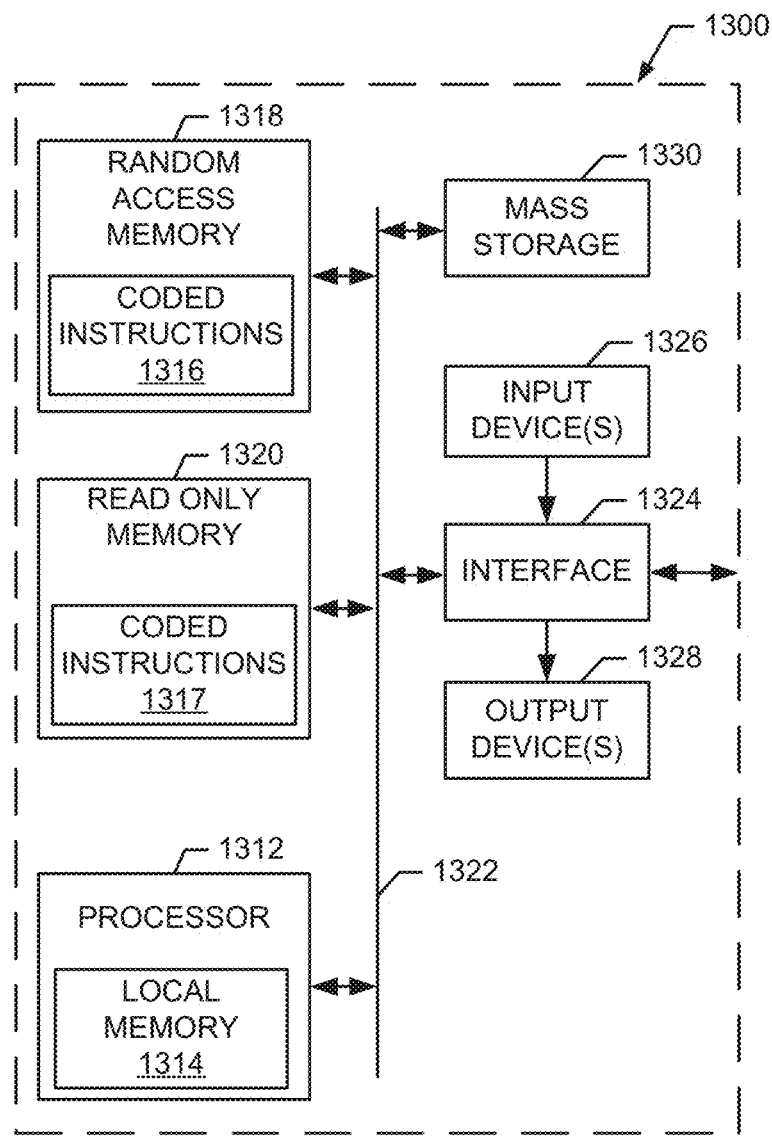
FIG. 13 is a schematic illustration of an example processor platform that may be used and/or programmed to execute the machine readable instructions of FIGS. 5-11 and/or 12 to implement the example system of FIG. 1, the example target detector of FIGS. 1 and/or 2, and/or the example target responder of FIGS. 1 and/or 3.

FIG. 13 is a block diagram of an example computer 1300 capable of implementing the apparatus and methods disclosed herein. The computer 1300 can be, for example, a server, a personal computer, a personal digital assistant (PDA), an Internet appliance, a DVD player, a CD player, a digital video recorder, a personal video recorder, a set top box, or any other type of computing device.

The system 1300 of the instant example includes a processor 1312 such as a general purpose programmable processor. The processor 1312 includes a local memory 1314, and executes coded instructions 1316 present in the local memory 1314 and/or in another memory device. The processor 1312 may execute, among other things, the example machine readable instructions illustrated in FIGS. 5-11 and/or 12. The processor 1312 may be any type of processing unit, such as a microprocessor from the Intel® Centrino® family of microprocessors, the Intel® Pentium® family of microprocessors, the Intel® Itanium® family of microprocessors, and/or the Intel XScale® family of processors. Of course, other processors from other families are also appropriate.

The processor 1312 is in communication with a main memory including a volatile memory 1318 and a non-volatile memory 1320 via a bus 1322. The volatile memory 1318 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1320 may be implemented by flash memory and/or any other desired type of memory device. Access to the main memory 1318, 1320 is typically controlled by a memory controller (not shown) in a conventional manner.

The computer 1300 also includes a conventional interface circuit 1324. The interface circuit 1324 may be implemented by any type of well known interface standard, such as an Ethernet interface, a universal serial bus (USB), and/or a third generation input/output (3GIO) interface.

One or more input devices 1326 are connected to the interface circuit 1324. The input device(s) 1326 permit a user to enter data and commands into the processor 1312. The input device(s) can be implemented by, for example, a keyboard, a mouse, a touchscreen, a track-pad, a trackball, isopoint and/or a voice recognition system.

One or more output devices 1328 are also connected to the interface circuit 1324. The output devices 1328 can be implemented, for example, by display devices (e.g., a liquid crystal display, a cathode ray tube display (CRT), a printer and/or speakers). The interface circuit 1324, thus, typically includes a graphics driver card.

The computer 1300 also includes one or more mass storage devices 1330 for storing software and data. Examples of such mass storage devices 1330 include floppy disk drives, hard drive disks, compact disk drives and digital versatile disk (DVD) drives. The mass storage device 1330 may implement, for example, the example target data database 110 and/or the example target results database 130 of FIG. 1.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories; or a signal containing computer instructions. A digital file attached to e-mail or other information archive or set of archives is considered a distribution medium equivalent to a tangible storage medium. Accordingly, the example software and/or firmware described herein can be stored on a tangible storage medium or distribution medium such as those described above or successor storage media.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, persons of ordinary skill in the art will readily appreciate that the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to respond to an interrogation from a remote device, the method comprising:
   decoding, by executing an instruction with a processor, both a first code and a request for a description of supported voice capabilities included in a same first signal received at a first time from the remote device via an optical communication link;
   when the first code is determined to match a handshake code, determining, by executing an instruction with the processor, a second signal to send via the optical communication link in response to the first signal, the second signal sent at a second time later than the first time, the second signal including a second code responsive to the first code and a response including the description of the supported voice capabilities; and
   after the second signal is sent via the optical communication link, exchanging voice communications with the remote device via the optical communication link.

2. The method of claim 1, further including:
   aligning an optical transceiver with an outpulsed optical signal from the remote device to increase an amount of received optical energy; and
   after determining the optical transceiver is aligned with the outpulsed optical signal, establishing the optical communication link with the remote device.

3. The method of claim 2, wherein the outpulsed optical signal is detected with a passive optical detector aligned with the optical transceiver.

4. The method of claim 2, wherein the establishing of the optical communication link includes opening a diaphragm to permit the optical transceiver to communicate with the remote device.

5. The method of claim 1, further including generating a warning to indicate that the remote device is hostile when the first code does not match the handshake code.

6. The method of claim 1, further including generating the second code based on the first code when the first code is determined to match the handshake code.

7. The method of claim 1, wherein the request is a first request, and the second signal includes location information responsive to a second request included in the first signal.

8. A machine readable memory including machine readable instructions which, when executed, cause a processor to perform operations comprising:
 decoding both a first code and a request for a description of supported voice capabilities included in a same first signal received at a first time from a remote device via an optical communication link;
 when the first code is determined to match a handshake code, determining a second signal to send via the optical communication link in response to the first signal, the second signal to be sent at a second time later than the first time, the second signal including a second code responsive to the first code and a response including the description of the supported voice capabilities; and
 after the second signal is sent via the optical communication link, exchanging voice communications with the remote device via the optical communication link.

9. The machine readable memory of claim 8, wherein the operations further comprise include:
 aligning an optical transceiver with an outpulsed optical signal from the remote device to increase an amount of received optical energy; and
 after determining the optical transceiver is aligned with the outpulsed optical signal, establishing the optical communication link with the remote device.

10. The machine readable memory of claim 9, wherein the outpulsed optical signal is detected with a passive optical detector aligned with the optical transceiver.

11. The machine readable memory of claim 9, wherein the establishing of the optical communication link includes opening a diaphragm to permit the optical transceiver to communicate with the remote device.

12. The machine readable memory of claim 8, wherein the operations further include generating a warning to indicate that the remote device is hostile when the first code does not match the handshake code.

13. The machine readable memory of claim 8, wherein the operations further include generating the second code based on the first code when the first code is determined to match the handshake code.

14. The machine readable memory of claim 8, wherein the request is a first request, and the second signal includes location information responsive to a second request included in the first signal.

15. An apparatus to respond to an interrogation from a remote device, the apparatus comprising:
 memory having machine readable instructions stored thereon; and
 a processor to execute the instructions to perform operations including:
  decoding both a first code and a request for a description of supported voice capabilities included in a same first signal received at a first time from a remote device via an optical communication link;
  when the first code is determined to match a handshake code, determining a second signal to send via the optical communication link in response to the first signal, the second signal to be sent at a second time later than the first time, the second signal including a second code responsive to the first code and a response including the description of the supported voice capabilities; and
  after the second signal is sent via the optical communication link, exchanging voice communications with the remote device via the optical communication link.

16. The apparatus of claim 15, wherein the operations further include:
 aligning an optical transceiver with an outpulsed optical signal from the remote device to increase an amount of optical energy received by a passive optical detector aligned with the optical transceiver; and
 after determining the optical transceiver is aligned with the outpulsed optical signal, establishing the optical communication link with the remote device.

17. The apparatus of claim 16, wherein the establishing of the optical communication link includes opening a diaphragm to permit the optical transceiver to communicate with the remote device.

18. The apparatus of claim 15, wherein the operations further include generating a warning to indicate that the remote device is hostile when the first code does not match the handshake code.

19. The apparatus of claim 15, wherein the operations further include generating the second code based on the first code when the first code is determined to match the handshake code.

20. The apparatus of claim 15, wherein the request is a first request, and the second signal includes location information responsive to a second request included in the first signal.

* * * * *